United States Patent
Kwon et al.

(10) Patent No.: US 9,830,721 B2
(45) Date of Patent: *Nov. 28, 2017

(54) RENDERING METHOD AND APPARATUS

(71) Applicant: Samsung Electronics Co., Ltd, Suwon-si (KR)

(72) Inventors: Kwon-taek Kwon, Seoul (KR); Seok-yoon Jung, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 187 days.

This patent is subject to a terminal disclaimer.

(21) Appl. No.: 14/190,615

(22) Filed: Feb. 26, 2014

(65) Prior Publication Data

US 2015/0062127 A1 Mar. 5, 2015

(30) Foreign Application Priority Data

Sep. 4, 2013 (KR) .................. 10-2013-0106311

(51) Int. Cl.
*G06T 11/40* (2006.01)
*G06T 15/00* (2011.01)

(52) U.S. Cl.
CPC ............ *G06T 11/40* (2013.01); *G06T 15/005* (2013.01)

(58) Field of Classification Search
CPC  G06T 1/20; G06T 15/10; G06T 17/10; G06T 11/40; G06T 15/005
USPC .................. 345/419, 421, 502, 418, 522
See application file for complete search history.

(56) References Cited

U.S. PATENT DOCUMENTS

| 7,456,846 | B1 | 11/2008 | King et al. | |
| 7,746,346 | B2 | 6/2010 | Woo | |
| 9,449,421 | B2 | 9/2016 | Kwon et al. | |
| 2010/0097377 | A1* | 4/2010 | Hasselgren | G06T 11/40 345/426 |
| 2010/0177105 | A1 | 7/2010 | Nystad et al. | |
| 2011/0199377 | A1* | 8/2011 | Jang | G06T 15/20 345/426 |
| 2012/0176386 | A1 | 7/2012 | Hutchins | |
| 2012/0293519 | A1* | 11/2012 | Ribble | G06T 15/005 345/501 |
| 2014/0118363 | A1* | 5/2014 | Hakura | G06T 15/005 345/505 |
| 2014/0139534 | A1* | 5/2014 | Tapply | G06T 15/005 345/522 |
| 2014/0184623 | A1* | 7/2014 | Frascati | G06T 1/20 345/522 |
| 2015/0091892 | A1* | 4/2015 | Kwon | G06T 15/005 345/419 |
| 2015/0097830 | A1* | 4/2015 | Jeong et al. | 345/421 |

(Continued)

FOREIGN PATENT DOCUMENTS

KR  10-2002-0063057  8/2002
KR  10-2012-0073804  7/2012

*Primary Examiner* — Chante Harrison
(74) *Attorney, Agent, or Firm* — F. Chau & Associates, LLC

(57) ABSTRACT

A rendering method includes determining, at a geometry processor, if a previous draw command from among previous draw commands is identical to a current draw command; in response to the previous draw command being identical to the current draw command, selecting a primitive list indicating a result of geometry processing performed on the previous draw command; and performing pixel processing using the primitive list.

15 Claims, 5 Drawing Sheets

(56) References Cited

U.S. PATENT DOCUMENTS

2015/0145858 A1* 5/2015 Park et al. .................. 345/522
2015/0187123 A1   7/2015 Hwang et al.
2016/0027144 A1   1/2016 Fernandez et al.

* cited by examiner

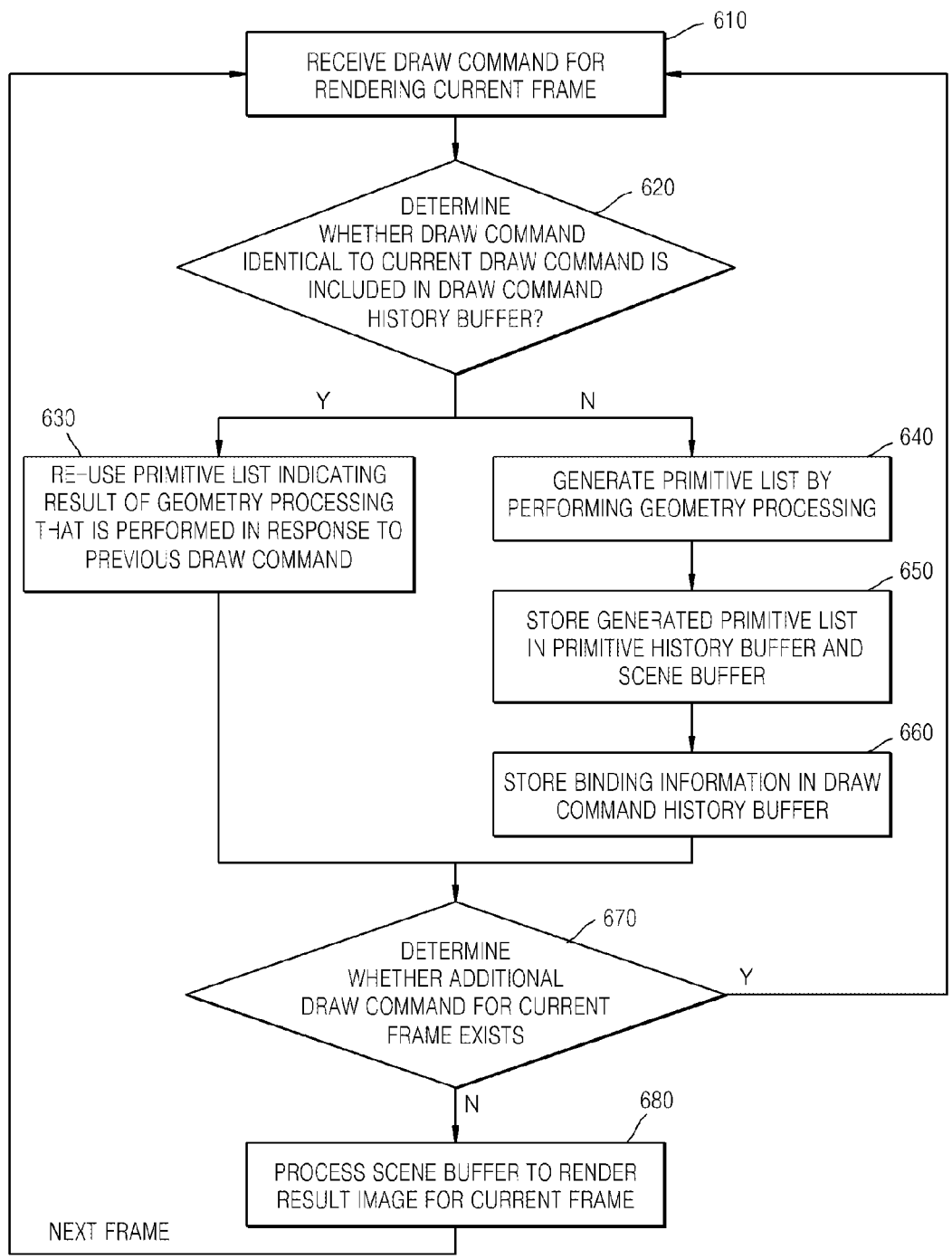

RENDERING METHOD AND APPARATUS

RELATED APPLICATIONS

This application claims the benefit under 35 U.S.C. §119 (a) of Korean Patent Application No. 10-2013-0106311, filed on Sep. 4, 2013, in the Korean Intellectual Property Office, the entire disclosure of which is hereby incorporated by reference for all purposes.

BACKGROUND

1. Field

The present disclosure relates to methods and apparatuses for rendering three-dimensional (3D) data.

2. Description of Related Art

Three-dimensional (3D) graphics application programming interface (API) standards include OpenGL, OpenGL ES, and Direct 3. API standards include a method of performing rendering on each frame and displaying an image, thus increasing the computation required and the power consumed. Accordingly, it is advantageous to reduce the computational amount and number of accesses to a memory when rendering is performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided a rendering method including determining, at a geometry processor, if a previous draw command from among previous draw commands is identical to a current draw command; in response to the previous draw command being identical to the current draw command, selecting a primitive list indicating a result of geometry processing performed on the previous draw command; and performing pixel processing based on the primitive list.

The determining may include comparing binding information of the current draw command with binding information on each of the previous draw commands; and selecting a previous draw command that has binding information identical to the binding information of the current draw command.

The binding information may comprise at least one of vertex attribute data, index data, vertex shader binary, uniform data, texture data, or configuration data.

The method may further include storing the primitive list in a scene buffer, and wherein the performing pixel processing comprises performing pixel processing using primitive lists stored in the scene buffer.

The storing in the scene buffer may comprise, in response to no previous draw command being identical to the current draw command, performing geometry processing based on the current draw command, and storing a primitive list that is generated by the geometry processing in the scene buffer.

The primitive list may be stored in a primitive list history buffer.

In response to no previous draw command being identical to the current draw command, the binding information of the current draw command may be stored in a draw command history buffer.

The determining may comprise comparing the previous draw commands stored in a draw command history buffer with the current draw command.

In another general aspect there is provided a rendering apparatus including a geometry processor configured to determine whether a previous draw command from among previous draw commands is identical to a current draw command, and to select a primitive list indicating a result of geometry processing performed on the previous draw command, in response to the previous draw command being identical to the current draw command; and a pixel processor configured to perform pixel processing by using the primitive list.

The geometry processor may be further configured to compare binding information of the current draw command with binding information on each of the previous draw commands, and to select a previous draw command that has binding information identical to the binding information of the current draw command.

The apparatus may further comprise a scene buffer configured to store the primitive list, and wherein the pixel processor is further configured to perform pixel processing using primitive lists stored in the scene buffer.

In response to no previous draw command being identical to the current draw command, the geometry processor may be further configured to perform geometry processing based on the current draw command, and to store a primitive list generated by the geometry processing in the scene buffer.

The geometry processor may be further configured to store the primitive list in a primitive list history buffer.

In response to no previous draw command being identical to the current draw command, the geometry processor may be further configured to store binding information of the current draw command in a draw command history buffer.

The geometry processor may be further configured to compare the previous draw commands that are stored in a draw command history buffer with the current draw command.

Other features and aspects will be apparent from the following detailed description, the drawings, and the claims.

BRIEF DESCRIPTION OF THE DRAWINGS

FIG. 6 is a diagram illustrating an example of a rendering method.

Figure 1:
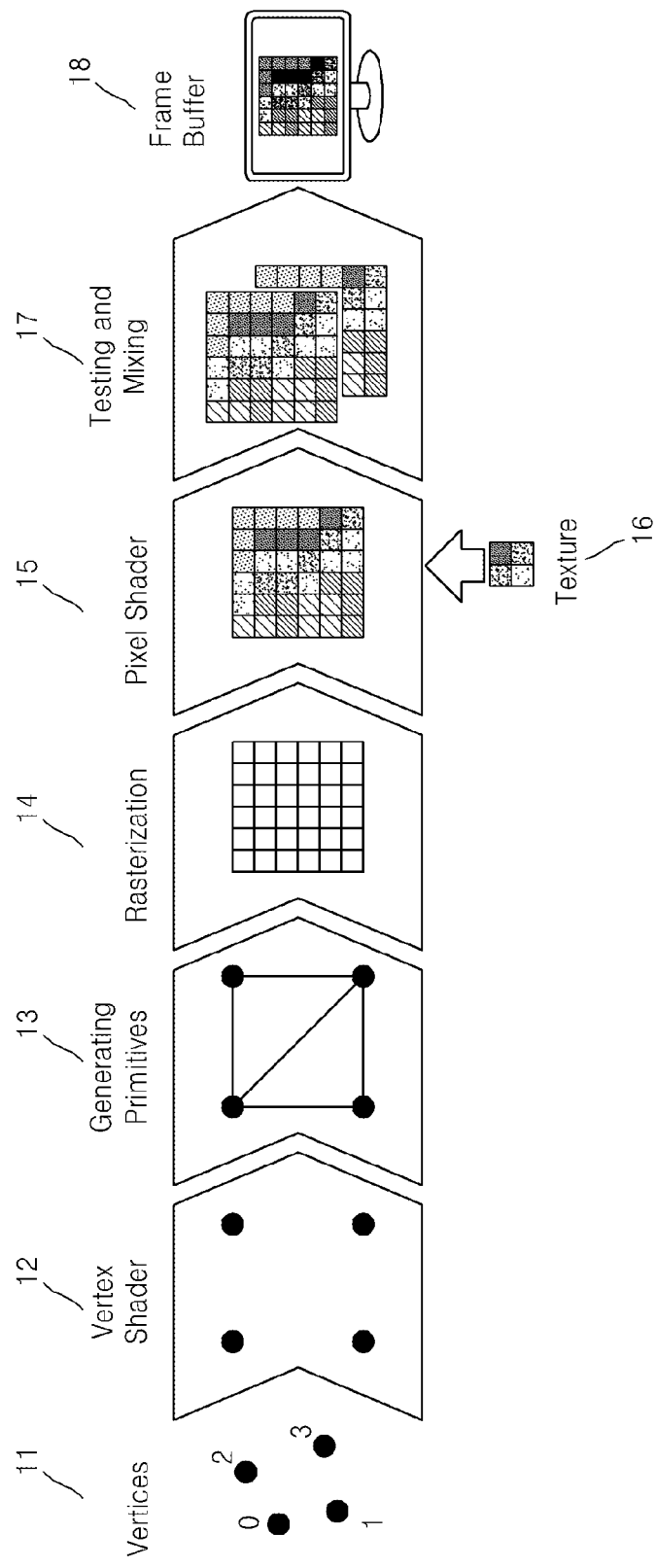
FIG. 1 is a diagram illustrating an example of a process of processing a three-dimensional (3D) image.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a process of processing a three-dimensional (3D) image, the process including operations 11 through 17. The operations in FIG. 1 may be performed in the sequence and manner as shown, although the order of some operations may be changed or some of the operations omitted without departing from the spirit and scope of the illustrative examples described. The operations 11 through 13 are operations of performing geometry processing, and the operations 12 through 17 are operations of performing pixel processing.

The operation 11 is an operation of generating vertices indicating an image. The vertices are generated in order to describe objects included in the image. The operation 12 is an operation of shading the generated vertices. A vertex shader may perform shading on the vertices by assigning colors to the vertices generated in the operation 11.

The operation 13 is an operation of generating primitives. The term 'primitive' refers to a polygon that is formed of points, lines, or vertices. For example, the primitives may be triangles formed by connecting three vertices.

The operation 14 is an operation of rasterizing a primitive. When the primitive is rasterized, the primitive is divided into a plurality of fragments. The term 'fragment' refers to a portion of a primitive and may be a basic unit for performing image processing. A primitive includes only information about vertices. Accordingly, interpolation is performed when fragments between vertices are generated during rasterization.

The operation 15 is an operation of shading pixels. Although shading is performed in units of pixels, shading may be also performed in units of fragments. For example, when pixels or fragments are shaded, colors of the pixels or the fragments are assigned to pixels of fragments.

The operation 16 is an operation of texturing the pixels or the fragments. Texturing is a method of using a previously generated image to designate a color of a pixel or a fragment. For example, when a color is designated to a fragment, shading is performed through computation whereas texturing is a method of assigning the same color as a color of an image, which has been previously generated to a fragment corresponding to the image.

In the operation 15 or 16, a large computational amount is required in order to shade or texture each pixel or fragment. Accordingly, it is advantageous to reduce the computational amount by more efficiently performing shading or texturing. An example of a method of reducing the computational amount during shading is hidden surface removal (HSR). HSR is a method that does not perform shading on a first object covered by a second object that is disposed in front of the first object.

The operation 17 is an operation of performing testing and mixing. The operation 18 is an operation of displaying a frame that is stored in a frame buffer. A frame generated through the operations 11 through 17 is stored in the frame buffer. The frame that is stored in the frame buffer is displayed on a display device.

Figure 2:
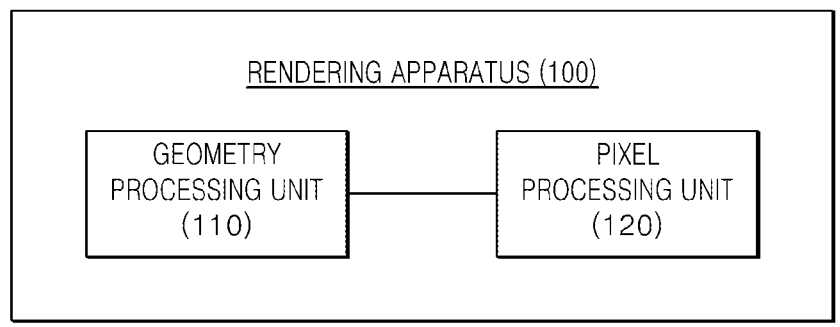
FIG. 2 is a diagram illustrating an example of a rendering apparatus.

FIG. 2 is a diagram illustrating an example of a rendering apparatus 100. Referring to FIG. 2, the rendering apparatus 100 performs rendering on a current frame by using a result of rendering performed on a previous frame. The rendering apparatus 100 includes a geometry processing unit 110 and a pixel processing unit 120.

The geometry processing unit 110 receives a draw command, and performs geometry processing according to the received draw command. The geometry processing unit 110 generates a primitive list in response to the draw command. If an input draw command is identical to a draw command that has been previously processed, the geometry processing unit 110 does not need to repeat the same computation.

The geometry processing unit 110 performs geometry processing on the current frame by using a result of rendering performed on the previous frame. The geometry processing unit 110 uses a result of geometry processing performed in response to the previous draw command.

When a current draw command is input, the geometry processing unit 110 determines if a previous draw command that is identical to the current draw command. The geometry processing unit 110 may compare binding information and may determine whether the current and previous draw commands are identical. The geometry processing unit 110 compares binding information of the current draw command with binding information of previous draw commands. Because of the comparison, the geometry processing unit 110 determines a previous draw command that has binding information identical to the binding information of the current draw command.

The term 'binding information' refers to information indicating which data a draw command uses as an input. Examples of input data used by a draw command may include, but is not limited to, vertex attribute data, index data, vertex shader binary, uniform data, texture data, and configuration data.

The geometry processing unit 110 stores in a scene buffer 150 the primitive list indicating the result of the geometry processing performed on the previous draw command. The geometry processing unit 110 outputs a result of geometry processing for the current draw command by using the primitive list of the previous draw command, without performing geometry processing in response to the current draw command. Since the current draw command and the previous draw command are identical, the geometry processing unit 110 need not perform geometry processing in response to the current draw command and uses the result of the geometry processing performed in response to the previous draw command to respond to the current draw command. Accordingly, the geometry processing unit 110 performs geometry processing for the current draw command by storing the primitive list of the previous draw command in the scene buffer 150.

When there is no previous draw command identical to the current draw command, the geometry processing unit 110 performs geometry processing in response to the current draw command, and stores a primitive list that is generated as a result of the geometry processing in the scene buffer 150. Since there is no previous draw command identical to the current draw command, the geometry processing unit 110 has no previous data to use. Accordingly, the geometry processing unit 110 generates a primitive list by performing geometry processing in response to the current draw command, and stores the generated primitive list in the scene buffer 150.

The geometry processing unit 110 determines primitive lists for all input draw commands, and stores the determined primitive lists in the scene buffer 150. When all draw commands for a current frame are processed, the geometry processing unit 110 ends geometry processing for the current frame.

The pixel processing unit 120 performs pixel processing on the current frame by using the primitive lists that are stored in the scene buffer.

Figure 3:
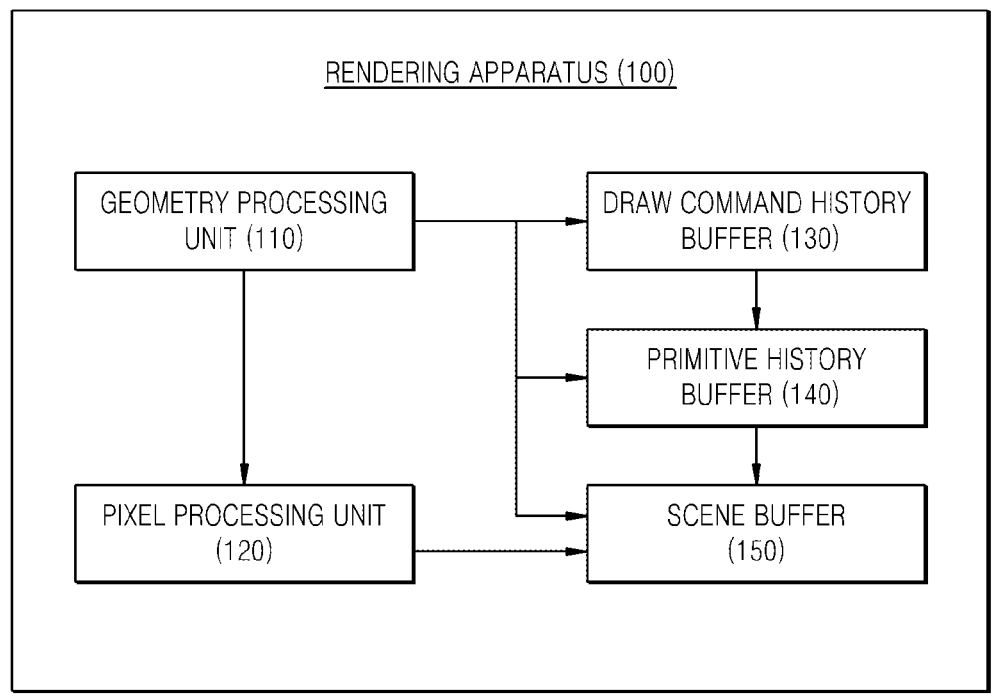
FIG. 3 is a diagram illustrating an example of a rendering apparatus.

FIG. 3 is a diagram illustrating an example of the rendering apparatus 100. The description of the rendering apparatus 100 in FIG. 2 is also applicable to the rendering apparatus 100 of FIG. 3, and thus will not be repeated here. Referring to FIG. 3, the rendering apparatus 100 further includes a draw command history buffer 130, a primitive history buffer 140, and a scene buffer 150.

The draw command history buffer 130 stores information about an input draw command. For example, the draw command history buffer 130 may store binding information of draw commands for previous n number of frames. Accordingly, when comparing draw commands, the geometry processing unit 110 uses the binding information that is stored in the draw command history buffer 130.

The primitive history buffer 140 stores a result of geometry processing that is performed in response to a draw command. The primitive history buffer 140 stores a primitive list that is generated by geometry processing. The geometry processing unit 110 may load the primitive list that is stored in the primitive history buffer 140 to the scene buffer 150.

The binding information that is stored in the draw command history buffer 130 and the primitive list that is stored in the primitive history buffer 140 correspond to each other. The binding information of the draw command history buffer 130 includes a pointer for the primitive list. When the binding information of a drawing command in the draw command history buffer 130 is identical to the binding information of a current draw command, the geometry processing unit 110 loads the primitive list that is indicated by the pointer included in the binding information stored in the draw command history buffer 130 to the scene buffer 150.

The scene buffer 150 stores primitive lists. The primitive lists that are stored in the scene buffer 150 are primitive lists for a current frame that is to be rendered. The pixel processing unit 120 generates an image for the current frame by performing rendering using the primitive lists that are stored in the scene buffer 150.

Figure 4:
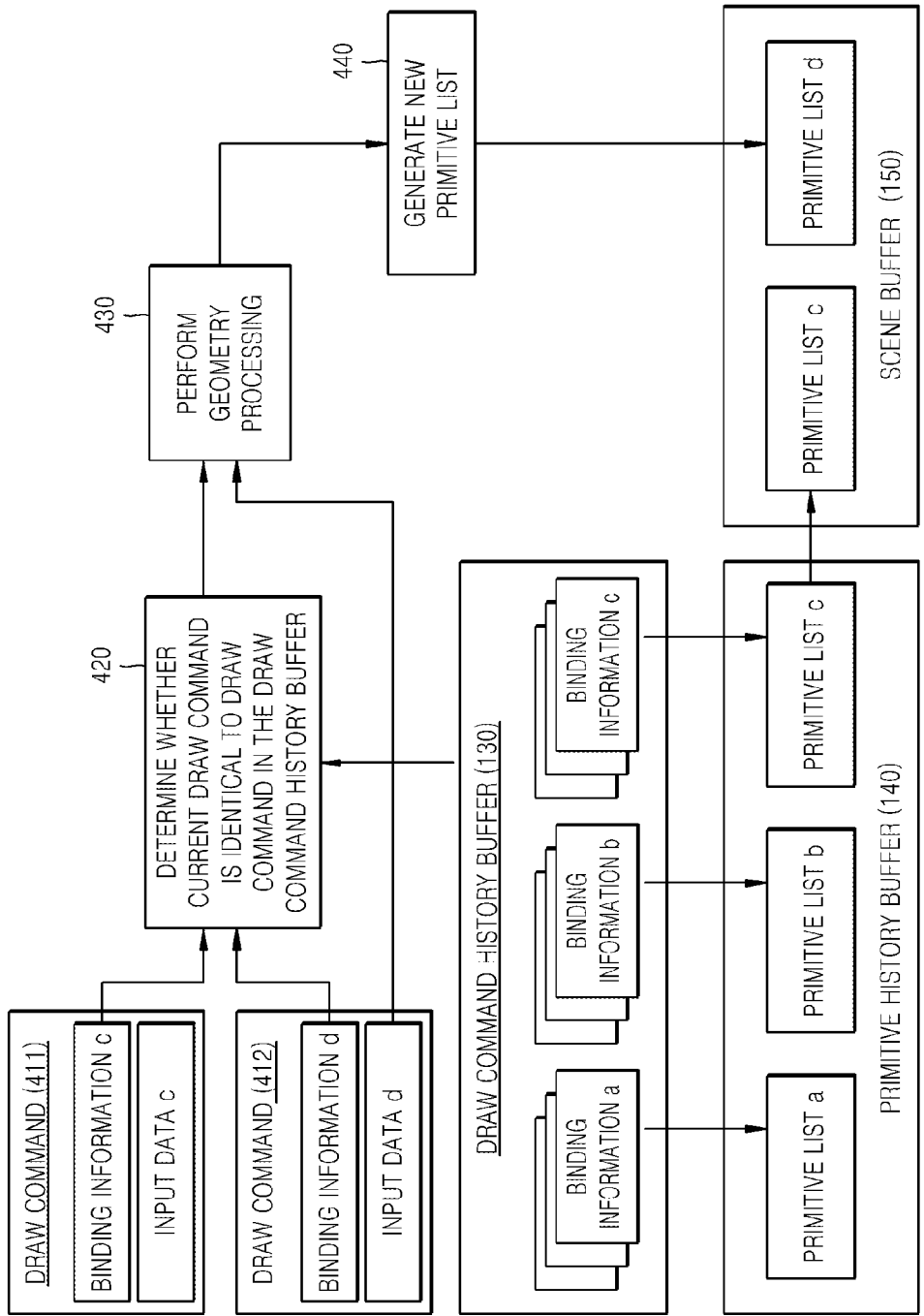
FIG. 4 is a diagram for explaining a rendering method.

FIG. 4 is a diagram for explaining a rendering method. Although FIG. 4 shows two draw commands, draw commands 411 and 412, that are input to the geometry processing unit 110. The two draw commands that are input to the geometry processing unit 110 in FIG. 4 are only non-exhaustive examples, and more or less number of draw commands are considered to be well within the scope of the present disclosure.

The draw command history buffer 130 stores binding information a through binding information c as binding information of a draw command for a previous frame. The binding information that is stored in the draw command history buffer 130 includes a pointer indicating a corresponding primitive list. The corresponding primitive lists, primitive lists a through primitive list c, are stored in the primitive history buffer 140. For example, the binding information a that is stored in the draw command history buffer 130 corresponds to a primitive list a that is stored in the primitive history buffer 140. The binding information b that is stored in the draw command history buffer 130 corresponds to a primitive list b that is stored in the primitive history buffer 140, and the binding information c that is stored in the draw command history buffer 130 corresponds to a primitive list c that is stored in the primitive history buffer 140.

The draw command 411 includes binding information c and input data c. The draw command 411 illustrates an example where a draw command that is identical to an input draw command is included in the draw command history buffer 130. The binding information c indicates that the draw command 411 uses the input data c as an input.

In operation 420, when the draw command 411 is input, the geometry processing unit 110 determines whether a draw command that is identical to the draw command 411 is included in the draw command history buffer 130. Binding information (the binding information a through binding information c) of previous draw commands is stored in the draw command history buffer 130. The geometry processing unit 110 compares the binding information c of the draw command 411 with the binding information that is stored in the draw command history buffer 130. Since the binding information c is stored in the draw command history buffer 130, the geometry processing unit 110 determines that a previous draw command is identical to the draw command 411. The rendering method does not proceed to operation 430. The geometry processing unit 110 loads the primitive list c that is stored in the primitive history buffer 140 and that is indicated by the pointer of the binding information c to the scene buffer 150.

The draw command 412 includes binding information d and input data d. The draw command 412 illustrates an example where a draw command that is identical to an input draw command is not included in the draw command history buffer 130. The binding information d indicates that the draw command 412 uses the input data d as an input.

In operation 420, when the draw command 412 is input, the geometry processing unit 110 determines whether a draw command identical to the draw command 412 is included in the draw command history buffer 130. The binding information (the binding information a through the binding information c) of previous draw commands is stored in the draw command history buffer 130. The geometry processing unit 110 compares the binding information d of the draw command 412 with the binding information (the binding information a through the binding information c) that is stored in the draw command history buffer 130. Since the binding information d is not stored in the draw command history buffer 130, the geometry processing unit 110 determines that no previous draw command that is identical to the draw command 412 exists. Since there is no previous draw command that is the same as the draw command 412, the geometry processing unit 110 proceeds to operation 430.

In operation 430, the geometry processing unit 110 performs geometry processing in response to the draw command 412. In this case, the geometry processing unit 110 performs geometry processing in response to the draw command 412 by using the input data d.

In operation 440, the geometry processing unit 110 generates a new primitive list as a result of the geometry processing performed in response to the draw command 412. The geometry processing unit 110 stores a primitive list d that is the new primitive list in the scene buffer 150. Thus, the scene buffer 150 includes the primitive list c and the primitive list d.

Since there is no previous draw command that is identical to the draw command 412, the geometry processing unit 110 stores the binding information d of the draw command 412 in the draw command history buffer 130. The geometry processing unit 110 also stores the new primitive list d that is generated as a result of the geometry processing for the input data d in the primitive history buffer 140. The binding information d that is stored in the draw command history buffer 130 includes a pointer to the primitive list d that is stored in the primitive history buffer 140.

When there is no more input draw commands to be processed, the geometry processing unit 110 determines that the scene buffer 150 for the current frame includes the primitive list c and the primitive list d.

The pixel processing unit 120 performs pixel processing by using the determined primitive lists c and d, i.e., the pixel processing unit 120 generates an image for the current frame by assigning colors to pixels.

Figure 5:
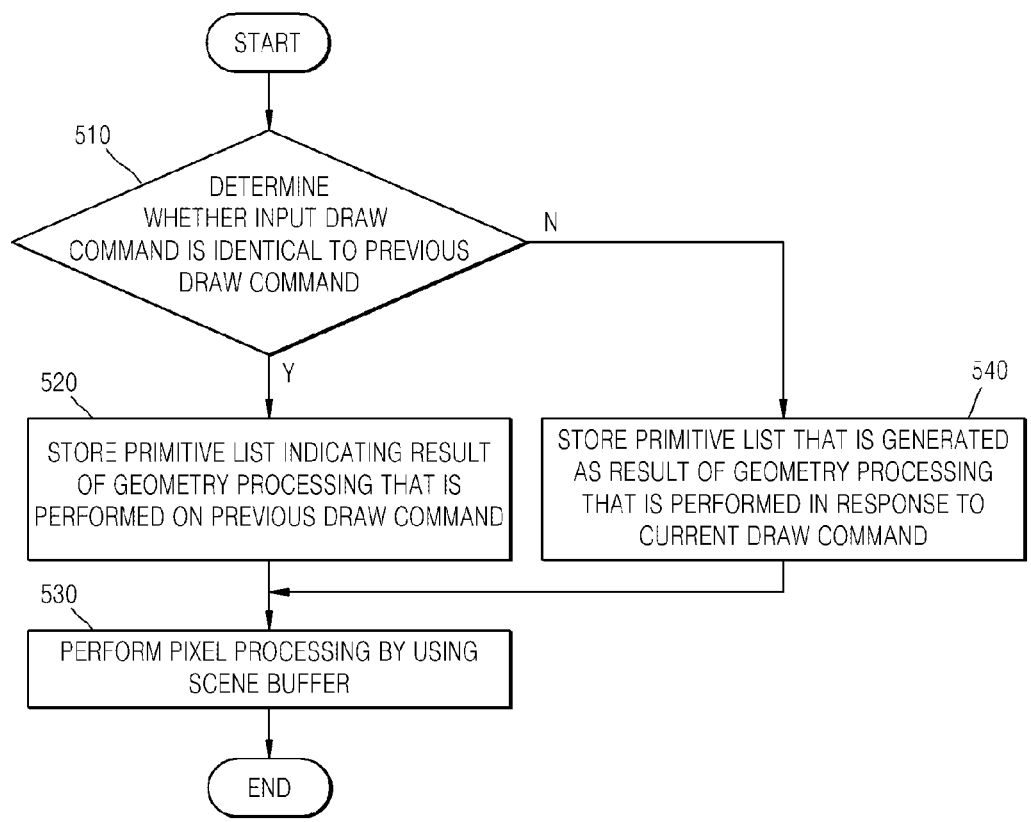
FIG. 5 is a diagram illustrating an example of a rendering method.

FIG. 5 is a diagram illustrating an example of a rendering method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. FIG. 5 illustrates another rendering method of the rendering apparatus 100 of FIG. 2. Accordingly, the description of the rendering apparatus 100 is included in the description of the rendering method of FIG. 5, and thus will not be repeated here.

The rendering apparatus 100 performs rendering on a current frame by using a result of geometry processing that has been previously performed. In operation 510, the rendering apparatus 100 determines whether a draw command that is input is identical to a previous draw command. If a draw command identical to an input draw command exists, the rendering method proceeds to operation 520, otherwise the rendering method proceeds to operation 540.

In operation 520, the rendering apparatus 100 stores in a scene buffer a primitive list indicating a result of geometry processing that is performed in response to the previous draw command.

In operation 540, the rendering apparatus 100 performs geometry processing in response to a current draw command, and stores in the scene buffer a primitive list that is generated as a result of the geometry processing.

In operation 530, the rendering apparatus 100 performs pixel processing by using the scene buffer, i.e., the rendering apparatus 100 generates a resulting image by performing pixel processing by using primitive lists that are stored in the scene buffer.

The rendering apparatus 100 may output a resulting image to a display device. The display device displays the received resulting image. The display device may be implemented as a liquid crystal display (LCD), a light-emitting diode (LED) display, a plasma display panel (PDP), an organic electroluminescent panel, a screen, a terminal, and the like. A screen may be a physical structure that includes one or more hardware components that provide the ability to render a user interface and/or receive user input. The screen can encompass any combination of display region, gesture capture region, a touch sensitive display, and/or a configurable area. The screen can be embedded in the hardware or may be an external peripheral device that may be attached and detached from the apparatus. The display device may be a single-screen or a multi-screen display. A single physical screen can include multiple displays that are managed as separate logical displays permitting different content to be displayed on separate displays although part of the same physical screen.

FIG. 6 is a diagram illustrating an example of a rendering method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. FIG. 6 illustrates another rendering method of the rendering apparatus 100 of FIG. 2. Accordingly, the description of the rendering apparatus 100 is included in the description of the rendering method of FIG. 6, and thus will not be repeated here.

In operation 610, the rendering apparatus 100 receives a draw command for rendering a current frame. In operation 620, the rendering apparatus 100 determines whether a draw command identical to a current draw command is included in a draw command history buffer. If a draw command identical to the current draw command is included in the draw command history buffer, the rendering method proceeds to operation 630, otherwise the rendering method proceeds to operation 640.

In operation 630, the rendering apparatus 100 re-uses a primitive list indicating a result of geometry processing that is performed on a previous draw command. The rendering apparatus 100 does not generate a primitive list corresponding to the received draw command, but outputs a result of geometry processing for the received draw command by re-using a primitive list that has been previously generated.

In operation 640, the rendering apparatus 100 generates a primitive list by performing geometry processing. The rendering apparatus 100 performs geometry processing in response to the received draw command, and generates a new primitive list. In operation 650, the rendering apparatus 100 stores the generated primitive list in a primitive history buffer 140 and a scene buffer 150.

In operation 660, the rendering apparatus 100 stores binding information corresponding to the generated primitive list in the draw command history buffer 130. The rendering apparatus 100 stores binding information of the received draw command in the draw command history buffer 130. When a storage space of the draw command history buffer is not sufficient, the rendering apparatus 100 may remove binding information that has been previously stored. The stored binding information includes a pointer indicating a primitive list that is stored in the primitive history buffer.

In operation 670, the rendering apparatus 100 determines whether an additional draw command for the current frame exists. If an additional draw command for the current frame exists, the rendering apparatus proceeds to operation 610, otherwise the rendering method proceeds to operation 680.

In operation 680, the rendering apparatus 100 processes the scene buffer in order to render a result image for the current frame. The rendering apparatus 100 generates the result image by performing pixel processing using primitive lists that constitute the scene buffer. When operation 680 ends, the rendering method proceeds to operation 610 in order to perform rendering on a next frame.

Since results of geometry processing performed on identical draw commands are the same, the rendering apparatus 100 omits a process of performing the same geometry processing. When there is no identical draw command, the rendering apparatus 100 may perform geometry processing in response to an input draw command, store a result of the geometry processing, and re-use the result of the geometry processing for a draw command that is subsequently input to be rendered.

The rendering apparatus 100 may include at least one processor. Also, each of the geometry processing unit 110 and the pixel processing unit 120 included in the rendering apparatus 100 may be a logic circuit or a program included in a processor. Alternatively, each of the geometry processing unit 110 and the pixel processing unit 120 may be an individual processor.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering method, comprising:
   determining, at a geometry processor, whether or not a previous draw command is identical to a current draw command, wherein the current draw command indicates a draw command for a current frame, and the previous draw command indicates a draw command for frames before the current frame,
   wherein when the geometry processor determines that a previous draw command is identical to the current draw command, the rendering method comprises selecting a primitive list indicating a result of geometry processing performed on the previous draw command, and
   wherein when the geometry processor determines that no previous draw command is identical to the current draw command, the rendering method comprises
   performing geometry processing based on the current draw command, and
   storing, in a scene buffer, a primitive list generated by the geometry processing; and
   performing pixel processing, in a pixel processor, based on the primitive list, wherein the geometry processing comprises generating vertices indicating an image, shading the generated vertices, and generating primitives.

2. The rendering method of claim 1, wherein the determining comprises:
   comparing binding information of the current draw command with binding information on each of the previous draw commands; and
   selecting a previous draw command that has binding information identical to the binding information of the current draw command.

3. The rendering method of claim 2, wherein the binding information comprises at least one of: vertex attribute data, index data, vertex shader binary, uniform data, texture data, or configuration data.

4. The rendering method of claim 2,
   wherein the binding information stored in a draw command history buffer and the primitive list stored in a primitive history buffer correspond to each other, and
   wherein the binding information includes a pointer for the primitive list.

5. The rendering method of claim 1,
   wherein the performing pixel processing comprises performing pixel processing by using primitive lists stored in the scene buffer.

6. The rendering method of claim 1, wherein the primitive list is stored in a primitive list history buffer.

7. The rendering method of claim 1, further comprising, when the geometry processor determines that no previous draw command is identical to the current draw command:
storing binding information of the current draw command in a draw command history buffer.

8. The rendering method of claim 1, wherein the determining comprises:
comparing previous draw commands stored in a draw command history buffer with the current draw command.

9. A rendering apparatus comprising:
a geometry processor configured to determine whether or not a previous draw command is identical to a current draw command, wherein the current draw command indicates a draw command for a current frame, and the previous draw command indicates a draw command for frames before the current frame, and
wherein when the geometry processor determines that a previous draw command is identical to the current draw command, the geometry processor is configured to load from a primitive list history buffer a primitive list indicating a result of geometry processing performed on the previous draw command, and
wherein when the geometry processor determines that no previous draw command is identical to the current draw command, the geometry processor is configured to perform geometry processing based on the current draw command, and is configured to store, in a scene buffer, a primitive list generated by the geometry processing; and
a pixel processor configured to perform pixel processing, by using the primitive list, wherein the geometry processing comprises generating vertices indicating an image, shading the generated vertices, and generating primitives.

10. The rendering apparatus of claim 9, wherein the geometry processor is further configured
to compare binding information of the current draw command with binding information on each of the previous draw commands, and
to select a previous draw command that has binding information identical to the binding information of the current draw command.

11. The rendering apparatus of claim 9, wherein the pixel processor is further configured to perform pixel processing by using primitive lists stored in the scene buffer.

12. The rendering apparatus of claim 9, wherein the geometry processor is further configured to store the primitive list in the primitive list history buffer.

13. The rendering apparatus of claim 9, wherein when the geometry processor determines that no previous draw command is identical to the current draw command, the geometry processor is further configured to store binding information of the current draw command in a draw command history buffer.

14. The rendering apparatus of claim 9, wherein the geometry processor is further configured to compare the current draw command with previous draw commands stored in a draw command history buffer.

15. A non-transitory computer-readable recording medium having embodied thereon a program for executing, by an apparatus including a geometry processor, the method of claim 1.

* * * * *